Feb. 16, 1954 J. H. BAIR 2,668,993
ELECTRICALLY HEATED VAPORIZER
Filed Aug. 7, 1950 2 Sheets-Sheet 1

JULIAN H. BAIR
Inventor
By Smith & Tuck
Attorneys

Feb. 16, 1954 — J. H. BAIR — 2,668,993
ELECTRICALLY HEATED VAPORIZER
Filed Aug. 7, 1950
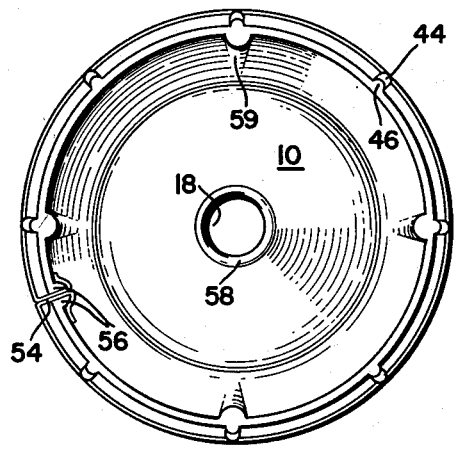
FIG__5
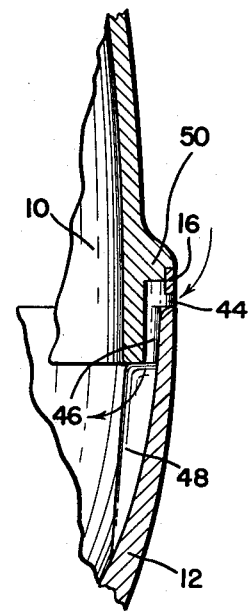
FIG__6
JULIAN H. BAIR
Inventor
By Smith & Tuck
Attorneys Patented Feb. 16, 1954

2,668,993

UNITED STATES PATENT OFFICE 2,668,993

ELECTRICALLY HEATED VAPORIZER

Julian H. Bair, Seattle, Wash.

Application August 7, 1950, Serial No. 178,060

2 Claims. (Cl. 21—120)

My invention relates in general to electrically heated vaporizers of the types used to vaporize disinfectants and other liquids which have the capacity of destroying the germs of virus which produce the respiratory diseases such as colds, pneumonia, and the like. Such infection is usually communicated by air-borne germs or virus. When such air is breathed, the germs become activated upon contact with the moist warm respiratory passages and the person suffers from the respiratory disease. Some of the structure shown in this application is similar to structure shown in my copending application, Serial No. 72,199, filed January 22, 1949, now abandoned.

Various attempts have been made to disinfect air so that such germs or virus will be destroyed. Considerable experiment was done in this field during World War II, it being realized that in war time unusually large numbers of people are placed in intimate contact during their working hours and at other times and the spread of airborne diseases is increased. The most outstanding and successful of the respiratory disease infection inhibitants experimented with was triethylene glycol.

The present electrically heated vaporizer was developed for use especially with said glycol. Triethylene glycol is an oily liquid, having the following general characteristics: a boiling point of 548° F.; a flashpoint (at which the vapor becomes combustible and a fire hazard) of 330° F.; and a "destruction" point of 290° F., at which temperature the vapor rapidly loses its effectiveness as a virus killer. The vapor has little or no germicidal value if heated to the flashpoint, at which temperature the glycol polymerizes. The only known means of vaporizing this material is by application of heat.

It has been found by extensive experimentation that the vaporizer must conform to quite exacting specifications in order to most satisfactorily perform the function of destroying germs in an area such as a room. The vaporizer must vaporize a quantity of material and direct the material so that the room is adequately disinfected; yet there must not be used enough heat to bring much of the glycol to the "destruction" point and there must not be used enough heat to bring the material to the dangerous flashpoint. The further condition must be met by producing a moderately priced vaporizer so that the same may be easily purchased by the general public.

Few devices in the prior art meet the exacting requirements needed in a vaporizer for triethylene glycol. Many of the prior art vaporizers are relatively expensive and complicated. The more simple devices would not seem to vaporize the glycol in sufficient quantities. The normal wick type vaporizers become so saturated with material that they lose effectiveness. Of course, some of the vaporizers were designed to vaporize in a room, other materials than glycol.

It is an object of my invention to provide a simple, safe and inexpensive device which will be effective in the atomization of liquids of the general class of triethylene glycol, without destroying the germ destroying properties of the same and without danger of reaching the flashpoint of the same. The device must be capable of vaporizing sufficient glycol to spread throughout an average size room in a home.

Vaporizing means must be provided capable of fulfilling the exacting requirements encountered in the vaporization of certain medicinal inhibitants. It is imperative that a safe device be provided that will not be a fire hazard. In order that the general public will be able to easily afford the important protection offered by a vaporizer for spread of vapors capable of killing air-borne germs, it is of great importance that a vaporizer be provided to retail at a moderate price.

A further object of my invention is the provision of a simple unit which will produce a vapor and cause it to be projected upwardly, so that it will reach the upper limit of the enclosure or room and there will be assisted by gravity as well as by convectional currents in thorough intermingling with the air particles of the entire room.

It is important to provide in a vaporizer having an electrical heating element that air ingress be exactly controlled and inner elements be exactly designed to heat the maximum amount of triethylene glycol to a vaporization point without raising the temperature of the same to the "destruction" point or the flashpoint; and inner elements should have air ingress and egress openings of a size to provide air to carry away a maximum quantity of vapors of said glycol.

In brief, my vaporizer has a liquid reservoir, preferably of an annular shape for manufacturing convenience and aesthetic considerations. This may be made of plastic having little chemical reaction with triethylene glycol. The reservoir is set on an annular metal base. The reservoir has a socket centered therein and standing up therefrom. An electric bulb is positioned in the socket. Wires lead from the electric bulb between the reservoir and the base to connect to a source of electrical energy.

Above the electric bulb is positioned an evaporator of cementitious, absorbent, porous material, which is non-combustible, and which, through capillary action, becomes impregnated with triethylene glycol from said reservoir. The evaporator has air ingress openings extending above the liquid level in the reservoir and has a central air egress opening in its upper surface.

A cover is positioned on the reservoir above the evaporator, there being lug means on the reservoir and the cover spacing the members apart, providing an air ingress opening. The lower edge of the cover is preferably positioned inside the reservoir so that condensate forming on the inside of the cover will run down into the reservoir. The cover carries an annular metal ring above the upper edge of the reservoir, providing means whereby the size of the air ingress opening may be carefully controlled. The cover has a central air egress opening with a downward extending annular lip to prevent condensate on the inside of the cover from creeping to the outside of the cover.

The vaporizer is rendered more efficient if the evaporator is shaped in the optimum manner. As recited before, due to the "destruction" and flashpoints of the glycol, it is important that it does not become over-heated. At the same time it is important that a large quantity of the glycol be heated to the vaporization point. The glycol carried by the evaporator reaches a level around the heating element of the electric bulb. The evaporator must be spaced from the bulb to keep the glycol from reaching too high a temperature; and, of course, this space also affords room for a current of air to pass the heated glycol. The heating elements in an electric bulb reach extremely high temperatures. Following the principle that radiant heat decreases as the distance from the source increases, heat by convection not being a problem with the flow of air past the bulb, the walls of the evaporator should be evenly spaced from the outside extensions of the heating element, so that the maximum area of evaporator saturated with glycol may be heated within the limits between the temperature necessary for evaporation and the "destruction" temperature.

If the heating element of an electric bulb is rotated about a vertical axis, it will be observed that the outline formed by its outer extensions will be in the form of a truncated cone. The sides of the evaporator adjacent should, therefore, be in the form of a truncated cone. This spaced relationship is only important in the area of the evaporator at the level of the heating element. However, as the sides of the evaporator in one area need to be in the form of a truncated cone, for aesthetic reasons and for reasons of convenience of manufacture, the downward extension of the evaporator is likewise cone shaped. This evaporator, then, is of optimum structure for use with an electric bulb of the shape shown. It is impracticable to manufacture an electric bulb especially for use with the vaporizer, bearing in mind that it is imperative to have a low priced unit. If an electric bulb were designed with a heating element of different shape, then the evaporator would be best in a conforming shape.

A cellulose fiber wick is positioned around the base of the evaporator principally to prevent splashing of the liquid during movement of the vaporizer.

My invention will best be understood from reading the following description of a specific embodiment, when read in conjunction with the attached drawings, in which:

Figure 5 is a view of the cover of the vaporizer, as viewed from below; and

Figure 6 is a fragmentary elevational sectional view, enlarged, of the joinder of the cover and reservoir.

Figure 1:
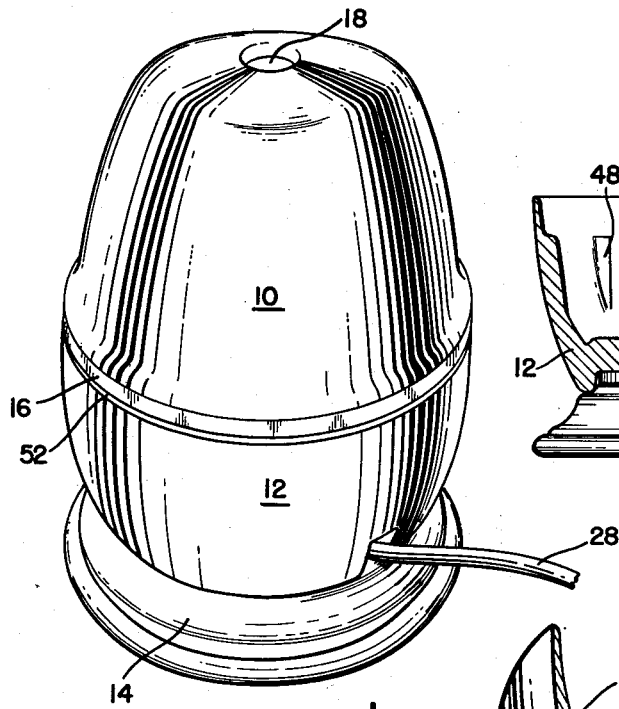
Figure 1 is a perspective view of one form of vaporizer embodying my invention.
Figure 4:
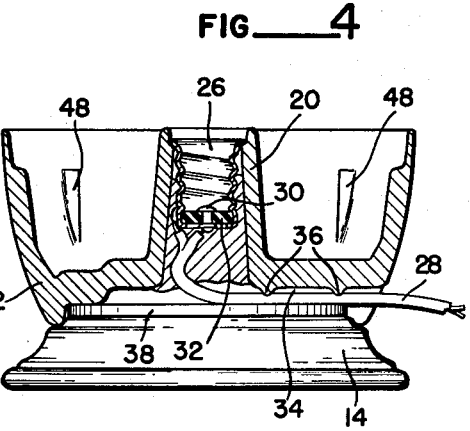
Figure 4 is an elevational view, partly in section, of the reservoir and base portion of the vaporizer.
Figure 3:
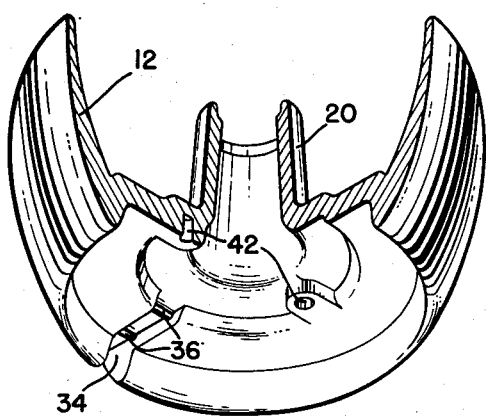
Figure 3 is an enlarged perspective view of the reservoir, partly in section, taken from a point below the reservoir.
Figure 2:
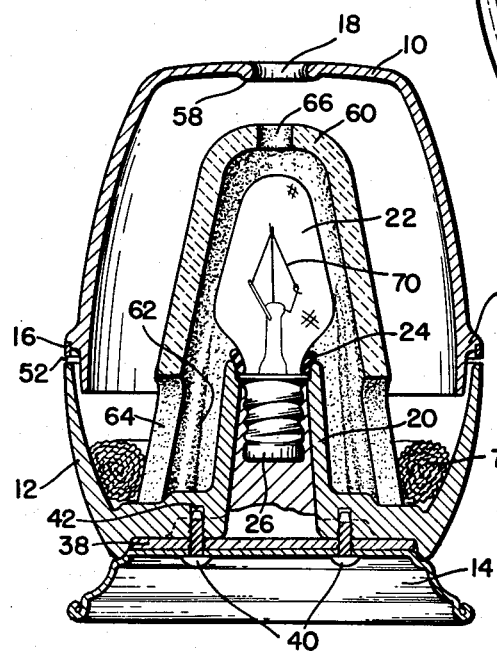
Figure 2 is an elevational view, partly in section.

Referring to Figure 1, cover 10 and reservoir 12 present somewhat an egg-shaped outline. Cover 10 and reservoir 12 are circular in horizontal cross-section and are preferably formed of a thermosetting plastic such as the phenolics that are not affected by heat and do not chemically react with triethylene glycol. Reservoir 12 is positioned on an annular base 14 which may be formed of metal. Base 14 has a visible concave portion and a rolled lower edge, presenting a pleasing effect. An annular ring 16 of metal between the visible portions of cover 10 and reservoir 12, serves a purpose to be described later.

The vaporizer has a distinctly ornamental appearance from the outside, with the pleasing shape and the contrast between the dark plastic and the metal members. The good aesthetic properties are of some importance as the vaporizer is designed for use in a home or the like, and the consumer would hesitate to purchase an unsightly article for such use. Cover 10 has a central opening 18; and, when the vaporizer is connected with an electrical source, a pencil of light is cast upward through opening 18 presenting an attractive effect, especially in the dusk or dark. This small amount of light may serve the purpose of a night light in a room.

A socket 20 is formed by an upstanding central portion of reservoir 12. Electric bulb 22 is positioned in this socket, there being a resilient washer 24 between bulb 22 and socket 20 to prevent passage of liquid into the electrical connection to the bulb. Washer 24 is preferably made of silicone, it being resistant to heat, has little reaction with glycol and is resilient. A threaded metal base 26 is positioned in socket 20 to receive the connector end of bulb 22. Wires 28 connect to base 26, one connecting with the side of base 26 and another with rivet 30 set in a non-conductive washer 32 in the lower end of base 26. Wires 28 lead to a plug, not depicted, to connect with a socket in the room in which the vaporizer is to operate. Wires 28 pass to the outside of the vaporizer through passageway 34 formed in the bottom of reservoir 12. A plurality of ribs 36, projecting into passageway 34, serve to secure wires 28 preventing pull on the connection with base 26.

When base 14 is made of light metal it is sometimes desirable to add weight by the addition of weighted member 38 which is positioned between reservoir 12 and base 14. Base 14 is secured to reservoir 12 by screws 40 running through base 14 and weighted member 38 and threaded into openings 42 in reservoir 12.

Cover 10 may be positioned on reservoir 12 by several forms of lug means. Inverted L-shaped extensions on the outside of cover 10 include lug portions 44 which rest on the upper lip of reservoir 12 and lug portions 46 which extend to the inside of surface of reservoir 12. Lugs 48 on the inside of reservoir 12 form a rest for the lower edge of cover 10. Lugs 48 and lug portions 44 serve the same purpose and one could be omitted. Other variations of lug means for positioning cover 10 will be apparent to those skilled in the art, the essential features being that the lower edge of cover 10 be positioned on the inside of reservoir 12 so that condensate forming on the inside of cover 10 will drip into the reservoir and the lug means position the members so as to provide an air ingress opening 52 between cover 10 and reservoir 12.

Cover 10 has a flange 50 on its outer surface formed to position the metallic annular ring 16 in a position parallel to and directly above the upper edge of reservoir 12. This determines the size of air ingress opening 52 between cover 10 and reservoir 12. As will be more fully developed later, means for accurately determining the size of this ingress opening 52 is of some importance in controlling the proper flow of air through the vaporizer. A plurality of widths of rings 16 may be manufactured so that, if the distance between cover 10 and reservoir 12 varies, different rings may be used and air ingress opening 52 may be substantially the same size in each case. The ends of annular ring 16 pass inside of cover 10 through opening 54 and are bent around lugs 56 on either side of opening 54 inside cover 10, affording convenient means for securing ring 16, as depicted in Figure 5. Ribs 59 on the inside of cover 10 are for convenience in manufacturing in ejecting cover 10 from a mold.

Central opening 18 in cover 10, for air egress from the vaporizer, has an inward projecting annular lip 58 which serves to keep condensate forming on the inside of cover 10 from creeping from the inside, through opening 18, to the outside of cover 10. Condensate gathering on lip 58 in sufficient quantity may drop from the lip.

Evaporator 60 is positioned on reservoir 12 over electric globe 22. Ribs 62 on the inside of evaporator 60 are for convenience in manufacturing, in easily ejecting evaporator 60 from a mold and adding strength to the structure.

Evaporator 60 is made of porous cementitious material. One satisfactory formula for making a suitable evaporator is as follows:

Measure by volume, two parts of adhesive material and one part of granular pumice. Mix, adding enough water to make a pourable fluid. Pour into molds and remove when set. The adhesive may be any one of several types of Portland cement or high tensile gypsum plaster such as plaster of Paris.

The material must be porous to permit capillary distribution of glycol from reservoir 12 throughout the evaporator. Evaporator 60 is in the nature of a wick and must be capable of permitting triethylene glycol to travel to a level where it may be directly affected by the heat from electric bulb 22, to vaporize said glycol. At the same time, it must be heat resistant and not have chemical reaction with the glycol.

Evaporator 60 has air ingress opening 64 with the uppermost portions of the openings above the fluid level in reservoir 12. The openings may conveniently be made with open lower portions for ease of manufacture. A central opening 66 in the upper surface of evaporator 60 forms air egress means.

The most convenient means of controlling the flow of air inside and outside of evaporator 60 is by correlation of the size of air ingress opening 52 and air egress opening 66. It is desirable that a portion of air entering through opening 52 pass inside evaporator 60 at a fairly rapid rate to pick up vapors of glycol formed there by the action of the heat from globe 22 and propel said vapors through opening 18 toward the ceiling of the room; and it is desirable that a portion of the air pass outside of evaporator 60 to pick up glycol vaporized at that point. If too much air comes through opening 52 the vaporizing effect of heat from globe 22 will be decreased due to the cooling effect of excess air passing on the inside of evaporator 60. If too small a quantity of air passes into the vaporizer, little will pass outside of the evaporator because, due to the heat of globe 22, the air has the tendency to mainly pass inside of evaporator 60. The opening 66 serves as check means on the amount and speed of air passing inside the vaporizer.

With a 7 watt bulb (7½ U. L.) and a reservoir and cover approximately 3½ inches high and 3 inches in diameter at the juncture of reservoir and cover, air ingress opening 52 is approximately $40/1000$ of an inch and air egress opening 66 in evaporator 60 is approximately $\frac{1}{16}$ of an inch.

Flow of air could also be determined, instead, by controlling the size of openings 18 and 64 or openings 18 and 66. The size of such openings are also determined by the size of the electric bulb and the size of the other members.

It has been found convenient to use a 7 watt bulb (7½ U. L.) taking into consideration the amount of vapor desired to be created, the dimensions of the vaporizer and dangers of "destruction" and flashing of vapors. To avoid excess cost, an ordinary type 7 watt bulb is employed.

Evaporator 60 must be spaced from bulb 22 to afford room for passage of air and to insure that glycol distributed in evaporator 60 is not close enough to bulb 22 to reach dangerous temperatures, but at the same time, the evaporator must be close enough so that the glycol will be heated to vaporization temperature. The glycol is heated not so much by convection, due to the constant flow of air between the bulb and the evaporator, as by radiation. It is well known that radiant temperature varies in proportion to the distance from the heat source. Therefore it is desirable that the sides of the evaporator be equally spaced from the outside limits of heating element 70, in order that the temperature on the evaporator be uniformly the optimum temperature between the temperature of vaporization of triethylene glycol and the "destruction" temperature of the same.

If the heating element in the usual 7 watt electric bulb is examined, it will be discovered that the shape is quite irregular. As the globe may be placed in any position with relation to the evaporator by the user, it is not practicable that evaporator 60 approximate that irregular shape for even spacing, and of course, there would be additional manufacturing problems with an irregular shape. As globe 22 may be in any relative position, then to determine that no surface of the evaporator will be close enough to the heating element 70 to endanger the glycol, evaporator 60 should be a shape conforming to the shape of the outline obtained by rotating heating element 70 around a vertical axis. Heating element 70 has its most extreme extension near the bottom and the next extreme extension near its top. The outline on top is substantially flat so we have the outline upon rotation which evaporator 60 is copied from, a truncated cone with a relatively flat top. As there is little heat below the bottom level of the heating element and for ease of manufacturing, the cone effect is carried on to the bottom of evaporator 60. The resulting figure is practicable to manufacture and of pleasing aesthetic qualities.

Wick 72 is positioned in reservoir 12 about the base of evaporator 60 principally to prevent splashing of the liquid in the reservoir. It also serves to wedge evaporator 60 in place. Wick 72 is made, preferably, of cellulose fiber, being absorbent and not reacting with glycol.

My vaporizer has proved to be a most efficient device, meeting the before-recited objects, and proving to be a most economical and attractive article. It is quite successful in carrying out its task of disinfecting air and destroying air-borne germs and virus.

Modifications of the illustrating design will be apparent to those skilled in the art and I do not wish to be limited to the embodying structure but desire to claim all vaporizers coming within the scope of my invention. Having thus described my invention, I claim:

1. An electrically heated vaporizer for disinfectants, comprising: a circular metal base; a circular, cup shaped liquid reservoir positioned concentrically on said base, having an upstanding annular central portion forming a socket with its upper edge substantially at the same level as the top edge of said reservoir; a threaded metal base positioned in said socket; an electric bulb positioned in said threaded metal base and upstanding therefrom with its heating element positioned above said reservoir; a resilient washer disposed between and sealing said bulb and said socket; lead wires connected to said threaded metal base; said reservoir having a recessed portion in its lower surface forming a horizontal passageway between said reservoir and said circular base through which said lead wires run, said reservoir having rib means in said recessed portion to clamp said lead wires against said circular base and secure them from movement; a hollow evaporator formed of porous material positioned on said reservoir over said bulb and spaced therefrom, having lower air ingress openings extending upwardly from the lower edge of said evaporator and having an upper air egress opening centered in its upper surface, the sides of said hollow evaporator being formed in the shape of a truncated cone whereby said sides are substantially equally spaced from the heating element of said bulb; a fabric wick positioned in the bottom of said reservoir around said evaporator; a hollow cover positioned on said reservoir; said hollow cover having a central egress opening in its upper surface coaxial with the egress opening of said evaporator and having an inwardly projecting annular lip around said central egress opening; said reservoir and said cover having lug means whereby the lower edge of said cover is positioned inside of the upper edge of said reservoir and spaced therefrom providing an air opening therebetween; and an annular metal ring positioned on the outer surface of said cover above the upper edge of said reservoir and spaced therefrom and limiting the flow of air through said air opening between said cover and said reservoir.

2. An electrically heated vaporizer for disinfectants, comprising: a base; a liquid reservoir positioned on said base; an electric bulb centered in said reservoir and standing up therefrom with its principal portion above the top of said reservoir; a hollow evaporator formed of porous material positioned on said reservoir over said bulb and spaced from said bulb, substantially the total radiating surfaces of said bulb being in direct, unobstructed relation to the adjacent inner surface of said evaporator for heating of the same, said evaporator having lower ingress openings and having an upper egress opening centered in its upper surface permitting air to circulate past said radiating surfaces, the upper ends of said lower ingress openings being at a level near the level of the top of said reservoir, said hollow evaporator being formed in the shape of a truncated cone; a hollow cover, having an egress opening centered in its upper surface and coaxial with the egress opening of said evaporator, positioned on said reservoir; the shape of said cover being generally similar to the shape of the adjacent, upper portion of said evaporator and the inner surface of said cover being generally equally spaced from said upper portion; said reservoir and said cover having lug means whereby the lower edge of said cover is positioned inside of the upper edge of said reservoir and spaced therefrom providing an air opening between the same; an annular ring member positioned on the outer surface of said cover above the upper edge of said reservoir and spaced therefrom and limiting the flow of air through said air opening between said cover and said reservoir.

JULIAN H. BAIR.

References Cited in the file of this patent

UNITED STATES PATENTS

| Number | Name | Date |
|---|---|---|
| 949,606 | Tetherow | Feb. 15, 1910 |
| 1,075,267 | Oddey | Oct. 7, 1913 |
| 1,144,508 | Taylor | June 29, 1915 |
| 1,712,204 | Gibney | May 7, 1929 |